United States Patent [19]

Chen

[11] Patent Number: 5,256,867
[45] Date of Patent: Oct. 26, 1993

[54] CARD READER APPARATUS

[75] Inventor: Harold Chen, Taipei, Taiwan

[73] Assignee: Verifone, Inc., Redwood City, Calif.

[21] Appl. No.: 814,896

[22] Filed: Dec. 30, 1991

[51] Int. Cl.⁵ .................. G06K 13/06; G06K 13/24
[52] U.S. Cl. ................................. 235/484; 235/449; 235/483
[58] Field of Search .................. 235/449, 483, 484; 360/2

[56] References Cited

U.S. PATENT DOCUMENTS

| | | | |
|---|---|---|---|
| 4,605,843 | 8/1986 | Aubrey | 235/475 |
| 4,723,071 | 2/1988 | McGeary | 235/449 |
| 4,788,420 | 11/1988 | Chang | 235/449 |

*Primary Examiner*—Harold Pitts
*Attorney, Agent, or Firm*—Lowell C. Bergstedt

[57] ABSTRACT

A reader assembly for reading a data carrier having at least one data track located at a prearranged data track position thereon. The reader assembly includes a transducer means having at least one data pickup element on a front face thereof. A guide means defines a guide slot having first and second side wall members and a bottom wall member adapted to guide a data carrier through the reader assembly, the first side wall member having an access window formed therein for permitting communication between the transducer means and the data carrier. A frame means carries the transducer means in a prearranged location thereon. The guide means and the frame means include a cooperative registration means, including a set of first position registration elements formed on the first side wall member and a set of second position registration elements formed on the frame means and cooperatively engaging the first position registration elements for establishing an accurately registered mounting relationship between the frame means and the guide means and thereby defining an accurate position location for the transducer means relative to the access window such that the data pickup element is accurately aligned with the data track. A pair of resilient hook arms are carried on the first side wall member and cooperating with a pair of hook engaging surfaces on the frame means to mount the frame means to the guide means.

19 Claims, 7 Drawing Sheets

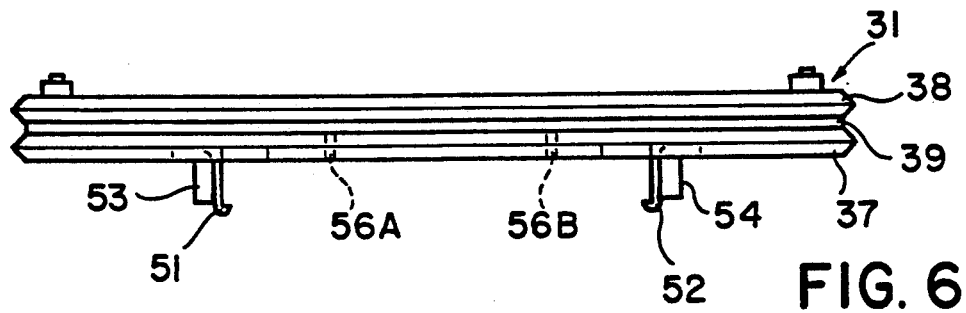
FIG. 6
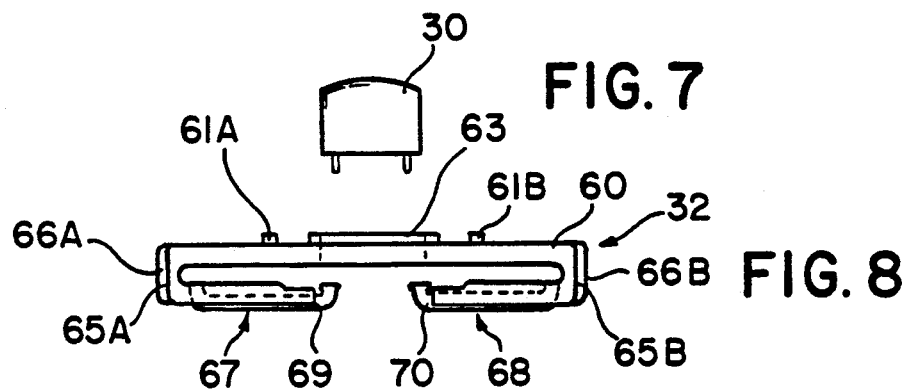
FIG. 7
FIG. 8
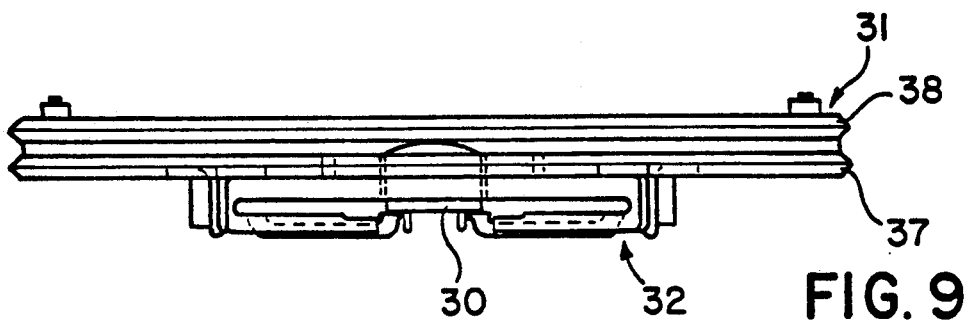
FIG. 9

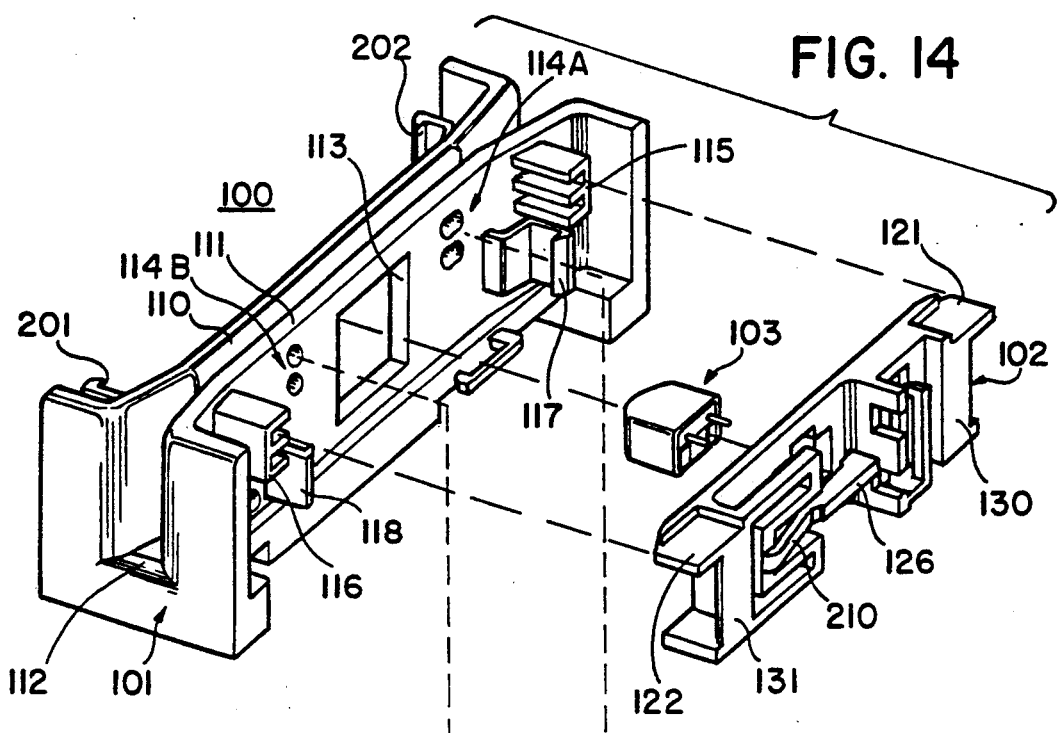
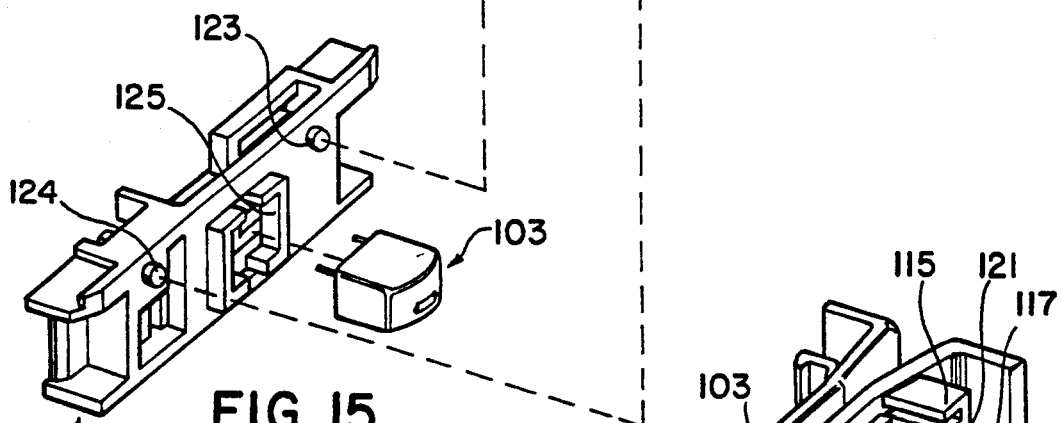
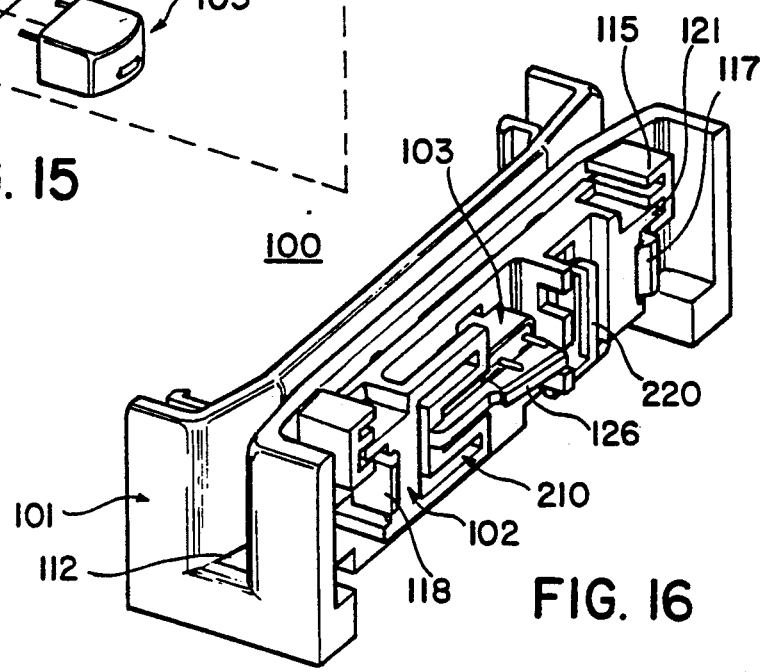

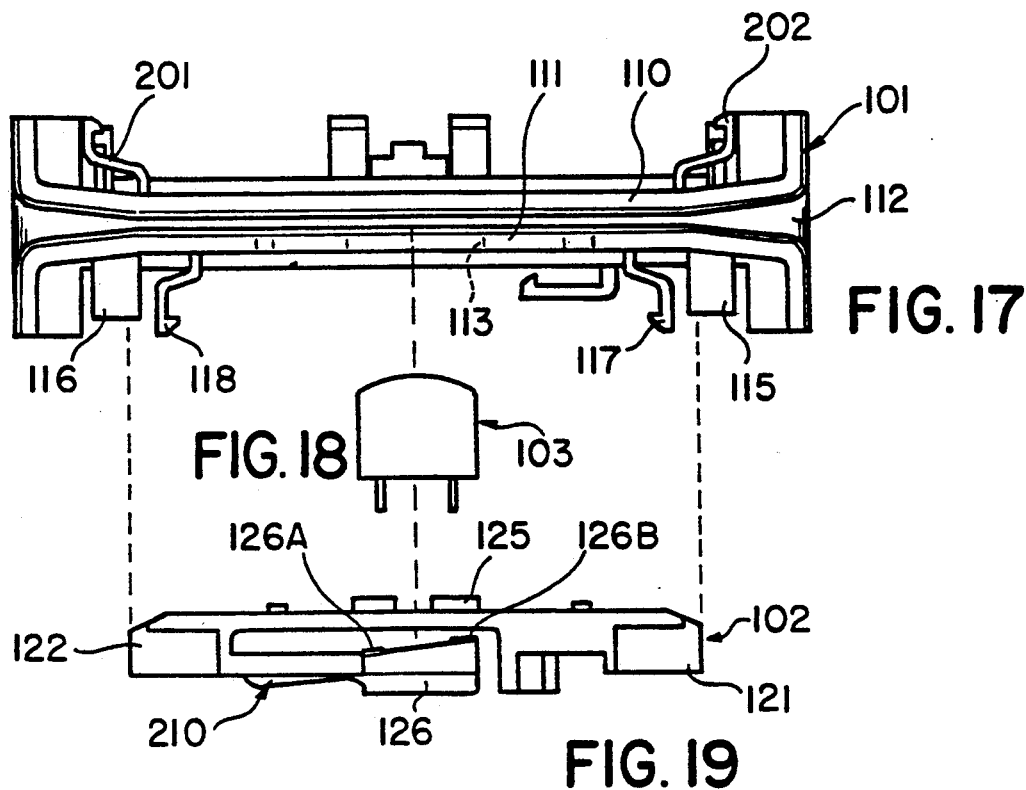
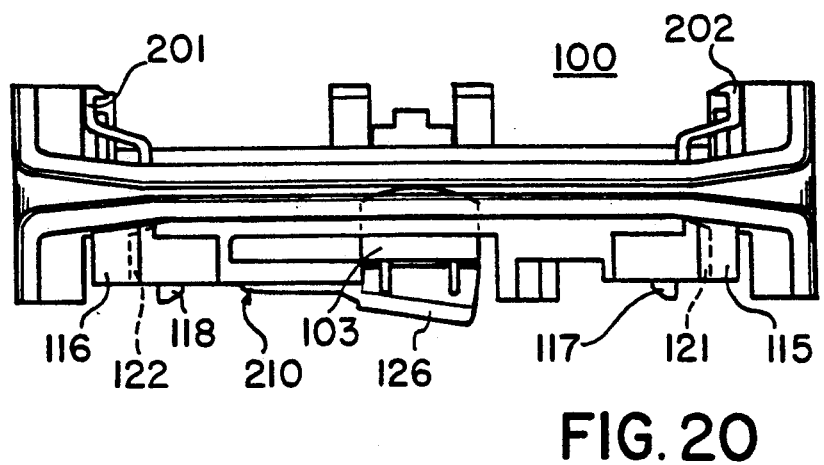

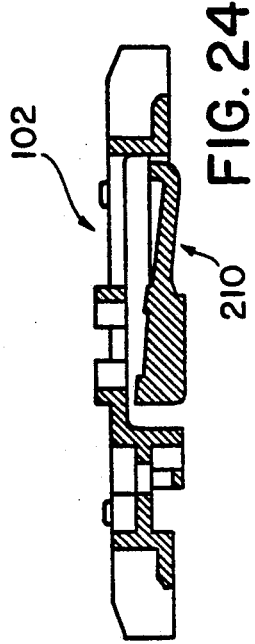
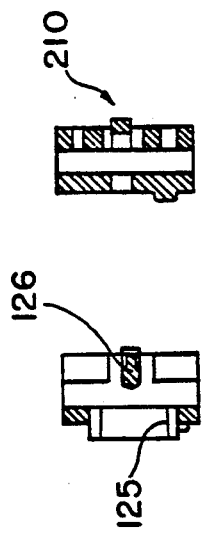
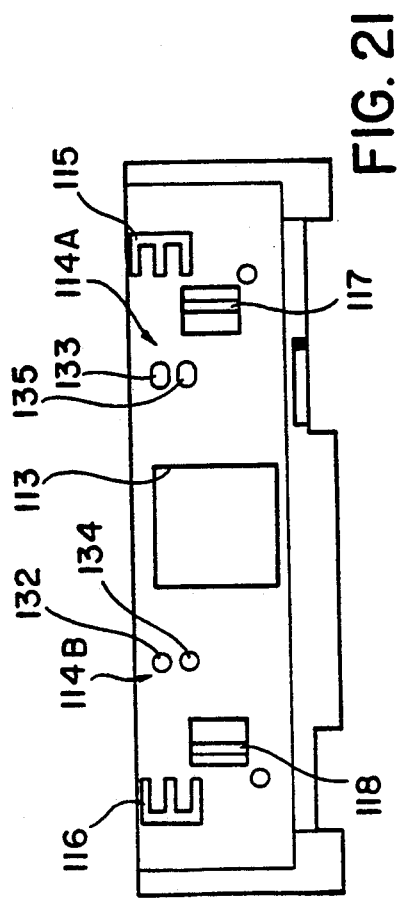
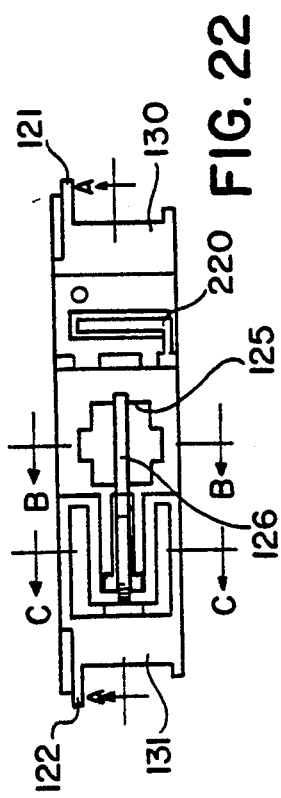
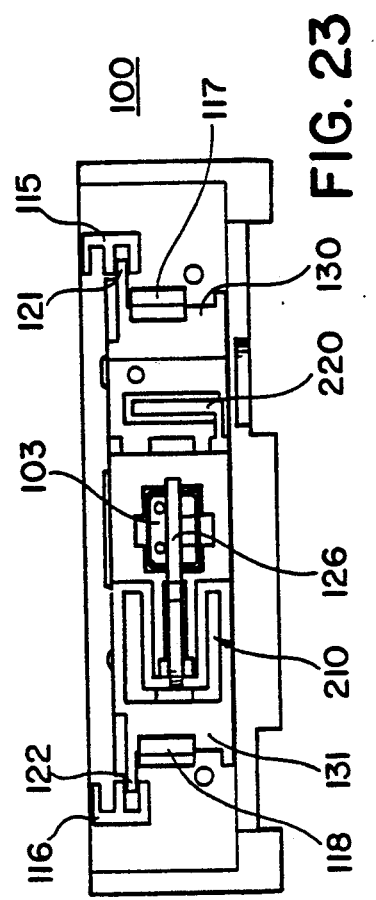

CARD READER APPARATUS

FIELD OF THE INVENTION

This invention relates generally to apparatus for reading data tracks on data carriers. More specifically, this invention relates to a data carrier reader subassembly with a snap together structure for use in apparatus such as a point of sale terminal. This invention also relates to a magnetic track data carrier reader with a magnetic head mounting arrangement including an integral head biasing spring.

BACKGROUND AND PRIOR ART

Chang et al. U.S. Pat. No. 4,788,420, entitled "System and Method for Reading Data Record Stripes on Data Cards," discloses one form of prior art point of sale terminal which incorporates a card reader assembly. The Chang et al. terminal utilizes a card guide which is integrally molded into the terminal case. A metal wear strip is molded into the bottom of the card guide slot to provide a surface which has better wear characteristics than the plastic material from which the terminal housing is formed in an injection molding process. In other prior art terminals generally following the same design approach, a separate metal wear strip is fastened to the terminal housing to form the bottom wall of a card guide slot and thereby provide longer wear characteristics. Other terminals use a metal strip to form both one side wall and the bottom wall of the card guide.

Kobayashi et al. U.S. Pat. No. 4,304,992, entitled "Magnetic Card Reader" discloses (FIGS. 4-6) a card reader in the form of a separate module with a housing that defines the card slot and encloses both the read head and decoder electronics for processing signals from the read head as a card is wiped through the slot. The card reader module is designed to be mounted to a point of sale terminal to provide a card reading function.

It is also known in the prior art to provide complete card reader subassemblies (i.e. with read head and decoder electronics together in a separate housing) that are designed to be physically integrated into the case of a point of sale terminal. For example, Tokin Corporation sells a card reader subassembly in which a read head mounting frame snaps onto a card guide element. However, the mounting frame has a single mounting position and utilizes a combination of a hanging bracket arrangement on a top portion and a snap fastening arrangement on a bottom portion. The accuracy of the mounting position of the mounting frame depends on accuracy of forming the elements of the hanging bracket, including hanger tabs provided on top of a frame support structure attached to the card guide element, and cooperative hanger slots formed on a top portion of the mounting frame itself. The snap fastening arrangement comprises a pair of snap tabs formed on a bottom section of the card guide element cooperating with snap tab receiving slots in a bottom wall surface on the mounting frame.

The snap tabs are relatively weak and fragile and susceptible to being broken off in rough handling of the unit prior to assembly of the two pieces.

The read head frame of the Tokin unit carries a magstripe read head which is mounted in a separate bracket through which a thin pin-type spring extends. Two mounting groove arrangements on the read head frame define two optional mounting support positions for the spring and thus define two mounting positions for the read head relative to the card guide for reading different tracks on the magnetic stripe.

Assembly of this unit involves mounting the read head into its metal bracket. Then the spring pin is placed through the holes in the metal bracket and this assembly is placed on the read head mounting frame in one of the two mounting positions. Then this assembly of head and mounting frame is mounted onto the card guide element by hanging the frame on the hanger portion and then snapping the frame onto the snap tabs. The separate read head bracket and spring add both parts and assembly labor to the overall cost of the unit.

OBJECTS OF THE INVENTION

It is the principal object of this invention to provide an improved reader assembly for a data carrier such as a data card.

It is another object of this invention to provide an improved snap together reader assembly for a data carrier.

It is another object of this invention to provide an improved reader subassembly for a magnetic stripe data card.

It is another object of this invention to provide an improved low cost card reader assembly which utilizes a minimum number of easily assembled parts.

It is another object of this invention to provide an improved magnetic card reader assembly having alternative head mounting positions for reading different data stripes or different combinations of data stripes.

It is another object of this invention to provide a point of sale terminal with an improved replaceable magnetic card reader subassembly.

It is another object of this invention to provide a card reader assembly that is readily configured for selectably reading one of several different data tracks or one pair out of two different pairs of data tracks on a data card.

FEATURES AND ADVANTAGES OF THE INVENTION

One aspect of this invention features a reader assembly for reading a data carrier having at least one data track located at a prearranged position thereon and utilizing a transducer means having at least one data pickup element on a front face thereof. A guide means defines a guide slot having first and second side wall members and a bottom wall member adapted to guide a data carrier through the reader assembly. The first side wall member has an access window formed therein for permitting communication between the transducer means and the data carrier. A frame means carries the transducer means in a prearranged location thereon. The guide means and the frame means include a cooperative registration means, including a set of position registration elements formed on the first side wall member and a cooperatively engaging set of position registration elements formed on the frame means for establishing an accurately registered mounting relationship therebetween. A pair of resilient hook arms carried on the first side wall member and cooperating with a pair of hook engaging surfaces on the frame means mount the frame means to the guide means.

This reader assembly provides a number of advantages. The snap mounting arrangement provides ease of assembly of the unit and low parts and labor cost. With the transducer means carried in a prearranged position on the frame means and the frame means mounted to the guide means in a registered position and held there by the snap mounting arrangement, the transducer means is accurately positioned relative to the access window with the data pickup element thereon accurately aligned with the data track.

One embodiment of this invention features a data card reader assembly for use in an arrangement in which the data track on the data carrier is positioned at a prearranged data track location corresponding to a one of at least first and second predefined data track locations on the data carrier. The cooperative registration means comprises two sets of first position registration elements formed on the first side wall member of the guide means and a single set of second position registration elements formed on the frame means. The set of second position registration elements is selectably engageable with each of the two sets of first position registration elements to position the frame means relative to the guide means in a selectable one of first and second registered positions. In this manner the data pickup element may be aligned selectably with one of the first and second predefined data track locations. To accommodate plural mounting positions, the hook engaging surfaces on the frame means are formed to permit engagement with the pair of resilient hook arms in both the first and second registered positions.

A preferred form of this embodiment includes a track alignment indicating means comprising a first alignment means formed on the first side wall member of the guide means and a second alignment means formed on the frame means. The first and second alignment means cooperatively assisting in aligning the guide means and the frame means for mounting the frame means in one of the first and second registered positions. Preferably, the first alignment means comprises first and second pairs of guide slots formed on the first side wall member of the guide means, and the second alignment means comprises a pair of alignment tabs formed on the frame means and adapted to be received into the guide slots. This track alignment indicating means facilitates initial alignment of the frame means relative to the guide means for a selected one of the two mounting positions while the unit is being assembled. The first and second pairs of guide slots can be labeled to indicate the related data track reading positions associated with each alignment position.

One particular embodiment of this invention is adapted for use with a data carrier having a magnetic data track thereon. The data pickup element on the transducer means is a magnetic read head adapted to contact the magnetic data track for reading data on the track and the access window is an aperture formed in the first one of the side wall members to admit the magnetic read head into the guide slot. The frame means is formed from a plastic material and has a read head frame formed thereon for carrying the magnetic read head and a spring means integrally formed thereon for engaging a magnetic read head carried in the read head frame and spring biasing the read head toward the guide slot. With this spring biasing contact pressure between the magnetic read head and the magnetic data track is maintained as the data carrier is passed through the guide slot.

One version of this embodiment is adapted for use with a data carrier having three predefined data track positions associated therewith and comprising tracks 1, 2, and 3, but the data carrier has only a pair of adjacent magnetic data tracks formed thereon at a preselected one of track 1 and 2 pair of a track 2 and 3 pair. In this embodiment, the magnetic read head has two magnetic pickup elements formed thereon at prearranged positions for simultaneously reading magnetic data on a pair of adjacent magnetic data tracks. The cooperatove registration means comprises two sets of first position registration elements formed on the first side wall member of the guide means and a single set of second position registration elements formed on the frame means. The second position registration elements are selectably engagable with each of the two sets of first position registration elements to position the frame means relative to the guide means in a selectable one of first and second registered positions. The first registered position aligns the two magnetic pickup elements with the track 1 and 2 pair and the second registered position aligns the two magnetic pick up elements with the track 2 and 3 pair. In this embodiment, the hook engaging surfaces on the frame means being formed to permit engagement with the pair of resilient hook arms in both the first and second registered positions.

The track alignment indicating feature of this invention as described above may advantageously be added to this particular embodiment. Using labeled first and second guide slots in the alignment indicating feature facilitates alignment for a particular pair of tracks during assembly of the unit and indicates which track alignment position is active in the completed unit.

Another aspect of this invention features a reader assembly for reading a data carrier having at least one magnetic data track located at a prearranged position thereon. The assembly includes a transducer means having at least one magnetic pickup element on a front face thereof for reading the magnetic data track. A guide means is provided for defining a guide slot and this guide means has first and second side wall members and a bottom wall member adapted to guide a data carrier through the reader assembly. The first side wall member having an access window formed therein for admitting the front face of the transducer means into the guide slot for contact with the magnetic data track on the data carrier. A frame means is provided for carrying the transducer means in a prearranged location thereon. and a mounting means mounts the frame means in a prearranged location on the guide means such that the transducer means is accurately positioned in the access window. The frame means is formed from a plastic material and has a spring means integrally formed thereon for engaging the transducer means for biasing the transducer means toward the guide slot to maintain contact pressure between the magnetic pick up head and the magnetic data track as the data carrier is passed through the guide slot.

The use of an integrally formed spring means on the frame means carrying the transducer means reduces the parts count and simplifies assembly of the reader unit.

In one version of this embodiment, the transducer means comprises a magnetic read head having a metal housing. The frame means has a central frame member receiving the read head and holding the read head in a prearranged position, the central frame member having tapered top and bottom walls which permit slight rotation of the magnetic read head around a central axis thereof to accommodate a warped card passing through the guide means. Preferably the integrally formed spring means has a head portion with a pair of contact portions formed thereon for contacting back edges of the metal housing of the read head to urge the read head toward the guide slot. Each of these contact portions preferably has a tapered contact surface to facilitate slight rotation of the housing relative thereto.

The integrally formed spring means of the reader assembly of this invention may comprise a single E-shaped spring element with a base member attached to the frame means and a central spring arm extending in cantilevered fashion behind the frame member and having a head member formed on a free end thereof with a pair of tapered contact elements being formed on a back end of the head member for contact with a back region of the transducer means. Alternatively, the integrally formed spring means may comprise a pair of E-shaped spring elements each having a base member attached to opposing ends of the frame means and a central spring arm extending in cantilevered fashion toward the frame member and having a tapered contact element on a free end of the spring arm for contact with a back region of the transducer means.

Other objects, features and advantages of this invention will be understood from the following detailed description taken in conjunction with the accompanying drawings.

BRIEF DESCRIPTION OF THE DRAWINGS

FIG. 6 is a top view of a card guide element forming a portion of one embodiment of a card reader assembly in accordance with this invention.

FIG. 7 is a top view of a magnetic read head useful with one embodiment of this invention.

FIG. 8 is a top view of a mounting frame element of one embodiment of a card reader apparatus in accordance with this invention.

FIG. 9 is a top view of one embodiment of an assembled card reader apparatus in accordance with this invention.

FIG. 14 is an exploded perspective view of an alternative embodiment of card reader apparatus in accordance with this invention.

FIG. 15 is a perspective view of a mounting frame element of the card reader apparatus of FIG. 14 showing additional features and mounting relationships relative to FIG. 14.

FIG. 16 is a perspective view of an alternative embodiment of card reader apparatus in accordance with this invention.

FIG. 17 is a top view of a card guide element forming a portion of a card reader apparatus in accordance with the embodiment of this invention shown in FIGS. 14–16.

FIG. 18 is a top view of a magnetic read head useful in card reader apparatus in accordance with the embodiment of this invention shown in FIGS. 14–16.

FIG. 19 is a top view of a mounting frame element useful in card reader apparatus in accordance with the embodiment of this invention shown in FIGS. 14–16.

FIG. 20 is a top view an assembled card reader apparatus in accordance with the embodiment of this invention shown in FIGS. 14–16.

FIG. 21 is a front view of a card guide element useful in card reader apparatus in accordance with the embodiment of this invention shown in FIGS. 14–16.

FIG. 22 is a front view of a mounting frame element useful in card reader apparatus in accordance with the embodiment of this invention shown in FIGS. 14–16.

FIG. 23 is a front view of an assembled card reader apparatus in accordance with the embodiment of this invention shown in FIGS. 14–16.

FIG. 24 is a section view of a mounting frame element of FIG. 22 taken along the lines A—A.

FIG. 25 is a section view of a mounting frame element of FIG. 22 taken along the lines B—B.

FIG. 26 is a section view of a mounting frame element of FIG. 22 taken along the lines C—C.

DETAILED DESCRIPTION OF INVENTION EMBODIMENTS

Figure 2:
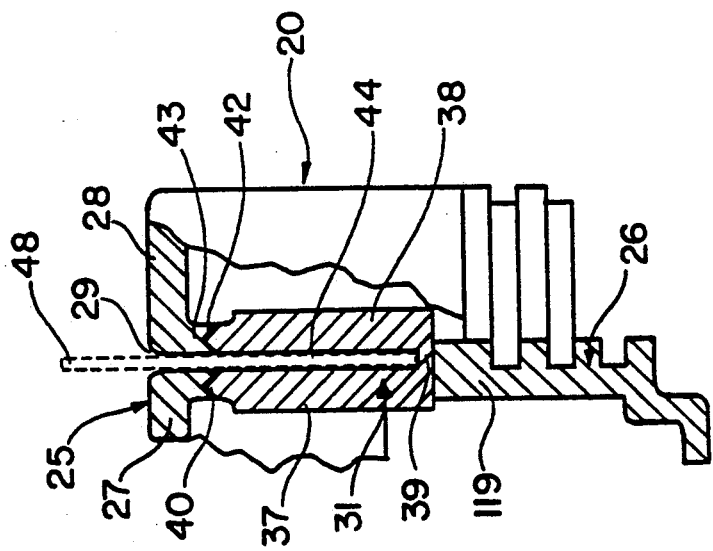
FIG. 2 is a partial section view of one embodiment of card reader apparatus in accordance with this invention and taken along the lines 2—2 in FIG. 1.
Figure 1:
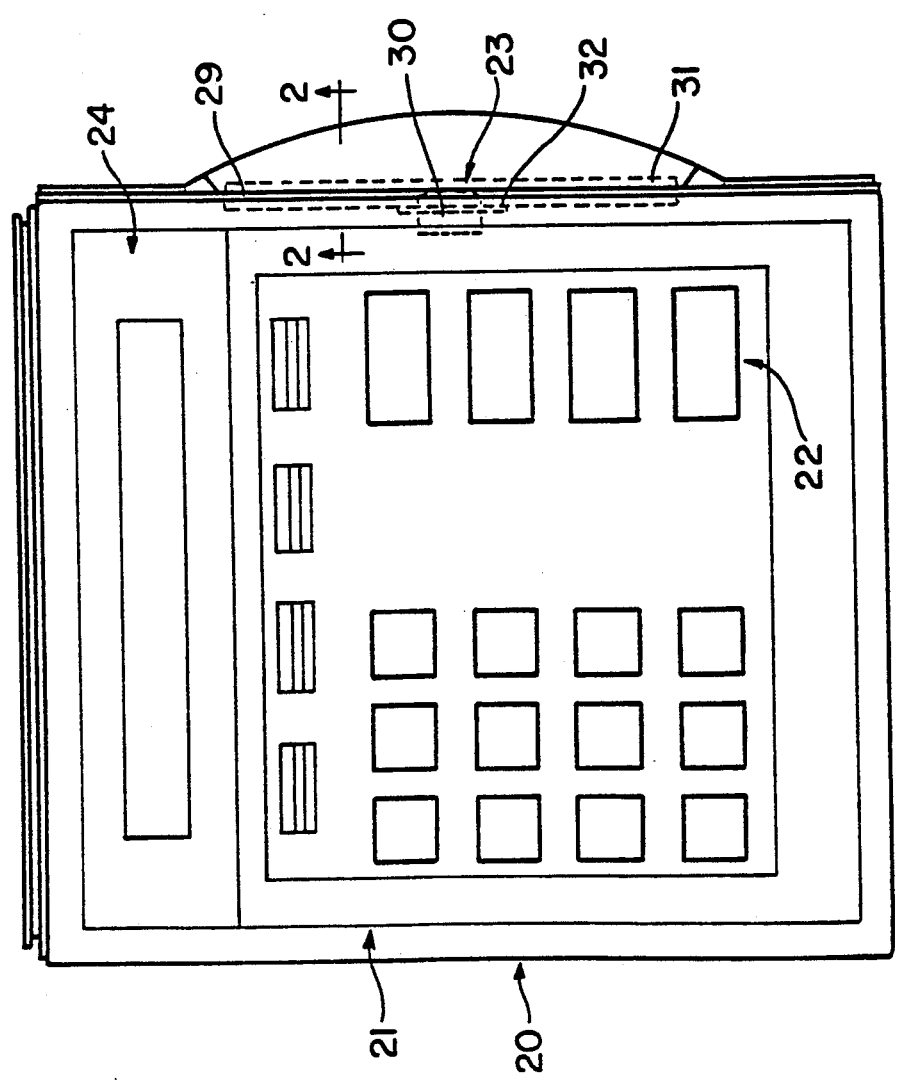
FIG. 1 is a top plan view of a point of sale terminal incorporating card reader apparatus in accordance with this invention.
Figure 3:
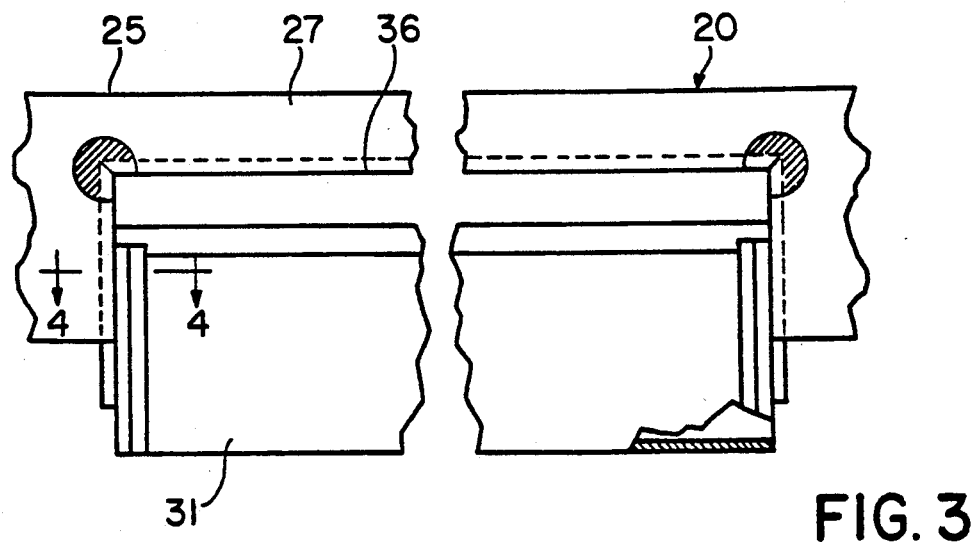
FIG. 3 is a partial assembly view showing the structure and mounting of a card guide element of card reader apparatus in accordance with one embodiment of this invention.

Referring now to FIGS. 1-3, the elements, structure, assembly operation and functioning of one embodiment of a card reader apparatus or card reader subassembly of this invention will be described. This embodiment of a card reader subassembly is useful in and will be described relative to a point of sale terminal in which the card reader may be removably mounted using certain cooperative mounting features of the card guide element and the terminal housing walls. The features involved in this mounting arrangement are the subject of co-pending and commonly assigned U.S. patent application Ser. No. 07/617,344, filed Nov. 23, 1991.

Apparatus 20 includes a reader subassembly 23 for reading a data carrier 48 (FIG. 2). Apparatus 20 in this case is a point of sale transaction automation terminal, but it should be understood that this invention has certain features which are generally applicable to reading a variety of data carriers used in a variety of applications. Data carrier 48 as shown here is a plastic card, e.g. a credit card or a debit card or other form of data card, which carries a magnetic stripe having one or more data tracks thereon. It should be understood that this invention is adaptable to use with various forms of data carriers in addition to data cards with magnetic stripes thereon.

For example, this invention is useful in conjunction with a data carrier with a bar code thereon or a data carrier, such as a check, with MICR bank account and identification data thereon. In each case the transducer employed to read the data as well as other aspects of the invention will be selected to fit reading of the data present on the data carrier.

Apparatus 20 includes a housing 21 which defines a guide slot location 29 for data carrier 48. A transducer in the form of magnetic read head 30 is provided for reading data stored on a data stripe on data carrier 48. A data carrier guide in the form of card guide 23 is removably mounted to housing 21 at data carrier slot location 29. Card guide 23 has a bottom wall portion 39 and a major side wall portion 37 and defines an access window (55 in FIG. 10). A mounting arrangement 32 is provided for mounting read head 30 at a prearranged location within access window 50 for accurate detection of data on the data stripe of data carrier 48 when it is manually swiped through guide slot 29. Read head 30 may be mounted in the left hand side of the card slot (as shown) or alternatively on the right hand side and this determines the orientation of the data card during a card swipe operation.

Housing 21 is preferably formed as an injection molded housing using a material, such as 900 series "Lexan" brand of polycarbonate material. Other plastic materials capable of being injection molded, but meeting laboratory standards for terminal housings could also be used. These materials typically have wear characteristics which make them unsuitable to form the acting surfaces of a card guide, i.e. the surfaces would not withstand the large number of card swipes at which terminals of this type are typically specified.

Card guide 31 may be formed by machining, injection molding, or a combination of extruding and machining depending on the materials used. However, injection molding of a strong material with good wear characteristics is preferred so that the card slot is capable of withstanding a minimum of several million swipes of a card therethrough without showing substantial surface wear to the point of degrading card reading performance. Preferably, the material is Nylon 6/6 with 30% short fiberglass and ten percent by weight of carbon particles dispersed therein to lower the resistivity of the material for static charge control. While this produces a gray or black colored material, card guide element 31 is typically hidden within the housing of the terminal or other device and thus color matching is not required.

The card guide element should be formed with smooth surfaces in the card guide slot region 44 so as to minimize wear on the data card passing therethrough.

Figure 4:
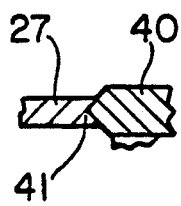
FIG. 4 is a partial section view taken along the lines 4—4 in FIG. 3.

Point of sale terminal 20, which incorporates a card reader apparatus having features of this invention will be described as a useful application environment although it forms no part of the invention. Terminal 20 includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies (not shown) that are mounted therewithin. Removable card guide 31 is mounted in a rectangular opening 36 formed in side wall portion 27 of top enclosure section 25. As shown in FIGS. 3 and 4, each of the edge sections 41 that define rectangular opening 36 have a groove formed therein that cooperates with a tongue formed on edge portions 40 of side wall 37 of card guide 31. Thus side wall 37 as adapted to be removably mounted in opening 36 by sliding it in from the bottom of the opening.

As shown in FIG. 2, side wall portion 28 of bottom enclosure section 26 and side wall portion 27 of top enclosure section 25 define card guide location 29. The active card guide slot 44 at the card reading location associated with read head 30 is, however, defined by side wall sections 37 and 38 and bottom wall section 39 of card guide 31. The upper edge of side wall section 38 has an outwardly extending tongue 42 formed thereon and this tongue cooperates with an associated groove 43 formed in side wall portion 28 to provide a stable, registered mounting relationship therebetween. Read head 30 is mounted to side wall 37 using a mounting frame 32 which is more fully described below.

Figure 5:
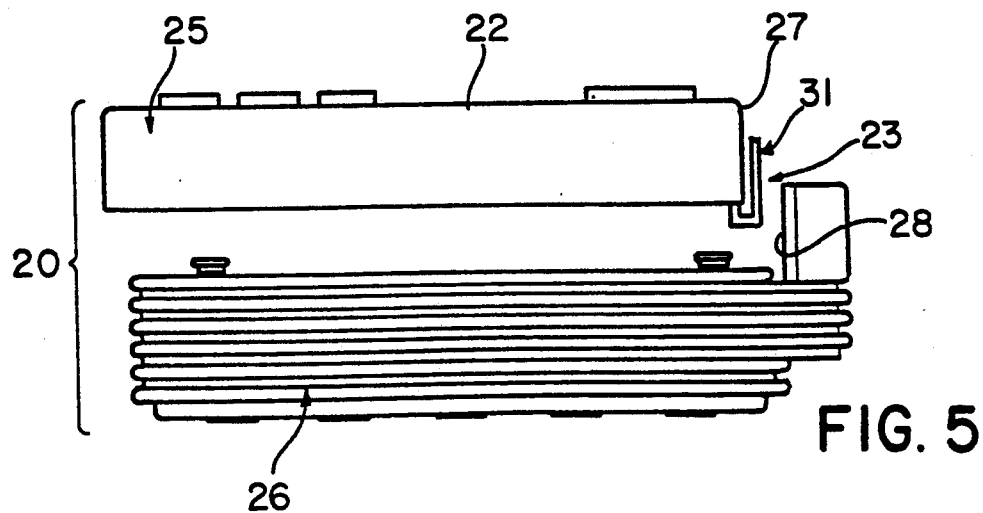
FIG. 5 is an exploded view which illustrates the assembly of the a terminal housing arrangement using a card guide arrangement in accordance with one embodiment of this invention.

As shown in FIG. 5, card guide 31 is first mounted to top housing member 25. To assemble housing 21, the tongue portion 42 is slipped into the groove portion 43 and then top housing member 25 is rotated and snapped together with bottom housing member 26. Bottom wall section 39 of card guide 31 rests on a platform 49 formed on bottom enclosure member 26 to provide full confinement of card guide 31 within housing 21. This tongue and groove mounting arrangement ensures that side walls 37 and 38 of card guide element 31 guide element will be maintained in precisely registered positions and form an accurately dimensioned card guide slot 44. The material of guide slot 31 provides long wear and the removable mounting arrangement provides the opportunity to repair or replace this subassembly if it becomes defective through wear or other causes.

Figure 10:
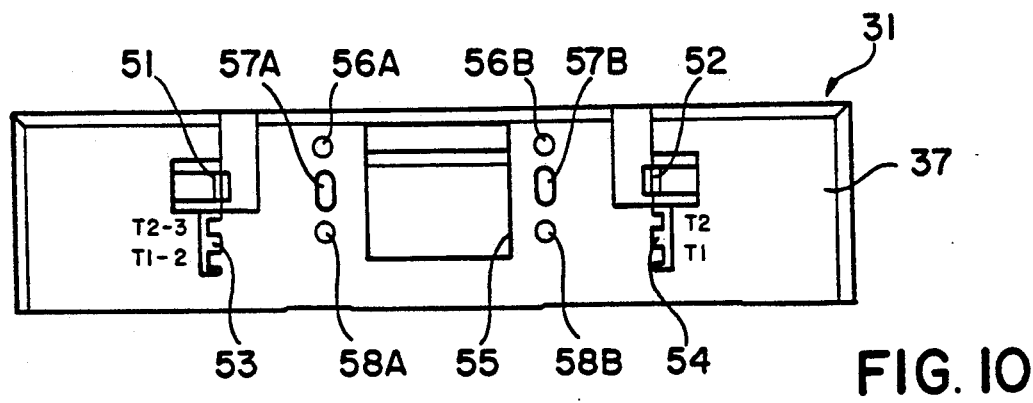
FIG. 10 is a front view of a card guide element forming a portion of one embodiment of a card reader assembly in accordance with this invention.
Figure 11:
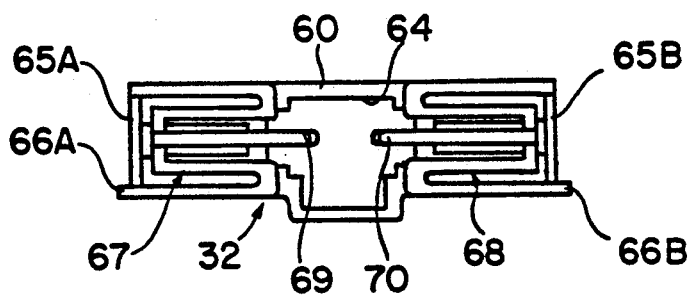
FIGS. 11 and 12 are, respectively, a front view and back view of a mounting frame element forming a part of one embodiment of a card reader apparatus in accordance with this invention.
Figure 12:
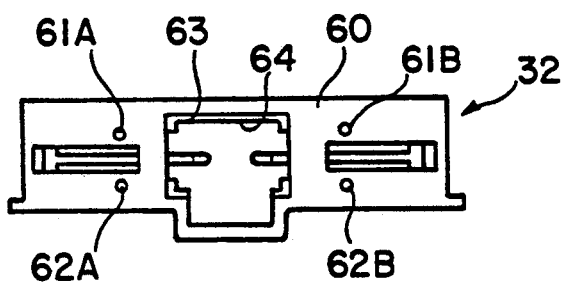

Referring now to FIGS. 6-13, details of structure and operation of a card reader assembly in accordance with one embodiment of this invention will be discussed. FIGS. 2, 6 and 10 illustrate the structure of card guide element 31. Opposing side wall members 37 and 38 together with bottom wall member 39 form a card slot through which a data card may be guided in a manual card swiping operation. Side wall 37 has integrally formed therein a pair of resilient hook arms 51, 52 to provide part of a snap together mounting arrangement to hold mounting frame 32 on card guide element 31 as shown particularly in FIG. 9. Reference is also made to FIGS. 14-16 which show elements of an alternative embodiment of this invention, but perhaps illustrate more clearly the snap together assembly feature of card reader apparatus of this invention.

Bracket elements 65A, 65B on mounting frame 32 cooperate with resilient hook arms 51,52 to latch these two parts securely together. A read head access window 55 is also formed in side wall 37 to receive the front portion of read head 30. The size of window 55 is designed to accommodate the positioning of read head 30 in a plurality of possible positions relative to the bottom wall of the card guide slot. Read head 30 is carried on mounting frame 32 in a central frame member 63.

Mounting frame 32 is preferably formed from a plastic injection molding material such as "Delrin 500" from Dupont. Read head 30 may be selected from a number of conventional read head technologies depending on the nature of the data track being read. In the case of a magnetic data track on a magnetic stripe on the data carrier, a conventional magnetic read head with single or dual pick up element structure may be employed.

A cooperative registration arrangement is provided on card guide element 31 and mounting frame 32 to enable mounting frame 32 to be snap mounted in a selectable one of two registered mounting positions on side wall 37. These registered mounting positions are referenced to the location of central frame member 63 on mounting frame 32 so that the read head 30 carried in the central frame member will be accurately registered in read head window 55 and data pickup elements thereon will be positioned to read the desired data tracks.

One form of a cooperative registration arrangement is shown as comprising two pairs of registration pin elements 61A,61B and 62A,62B formed on a back surface of wall 60 of mounting frame 32 at accurately located positions. In a front surface of side wall 37 are formed an arrangement of registration apertures and slots, comprising in this embodiment two pairs of apertures 56A,56B and 58A,58B together with a pair of registration slots 57A,57B. These pairs of apertures and pair of slots are formed at accurately located positions relative to the bottom wall member of the card guide element. The positions of these registration apertures and slots in side wall 37 determine the positions of the two pairs of registration pin elements on mounting frame 32.

It should be apparent that other forms of cooperative registration arrangements could be utilized. In some embodiments, it may be possible to switch the registration pin elements and registration apertures and slots between the two parts. A single pair of registration pin elements such as the ones shown in the embodiment of FIGS. 14–23 may be sufficient in some instances.

Figure 13:
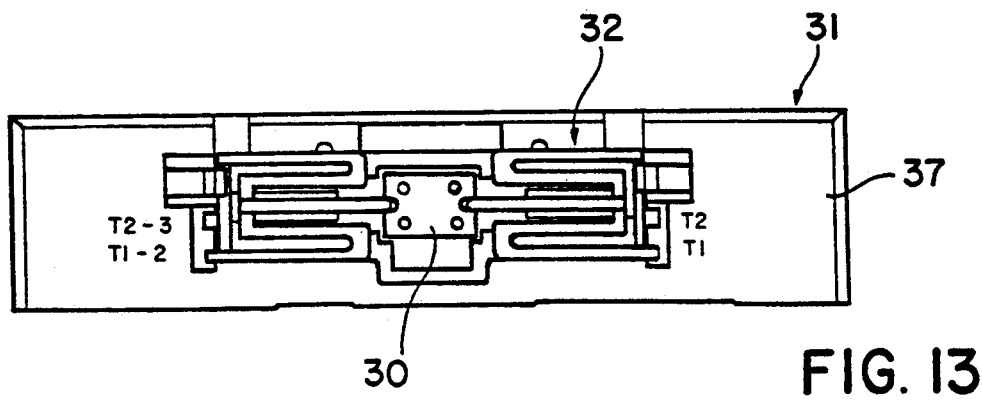
FIG. 13 is a front view of an assembled card reader apparatus in accordance with this invention.

A cooperative alignment guide arrangement is provided on card guide element 31 and mounting frame 32. Alignment guides 53 and 54 are carried on side wall 37 of card guide element 31. Associated alignment guide tabs 66A,66B are carried on mounting frame 32. As shown in FIG. 13, alignment guides 53,54 may comprise an arrangement of two slots each associated with one of two selectable mounting positions for mounting frame 32.

The two alignment slots on alignment guide 53 are labeled T1-2 and T2-3 to indicate mounting positions associated, respectively, with a first pair of tracks, i.e. Tracks 1 and 2 and a second pair of tracks, i.e. Tracks 2 and 3. This dual track alignment arrangement pertains to a mounting frame carrying a magnetic read head with dual track pick up elements on a front face thereof.

The two alignment slots on alignment guide 54 are labeled T1 and T2, respectively, and are useful in connection with aligning a mounting frame carrying a magnetic read head with a single track pick up element on a front face thereof. These alignment slots thus indicate a first mounting position associated with aligning the single pick up element with Track 1 on a magnetic stripe card and a second mounting position similarly associated with Track 2.

This alignment arrangement is not relied up for any precision in locating the pick up elements on read head 30 with respect to data tracks on a data card. Precise registration is achieved by the cooperative registration arrangement previously described. For Track 1 and 2 alignment and registration, registration pins 62A,62B are received into registration apertures 58A,58B while registration pins 61A, 61B are received into slots 57A, 57B. The location of registration pins 62A,62B on mounting frame 32 together with the location of registration apertures 58A,58B positions mounting frame 32 are such that the read head and, more particularly, data pickup elements on a front face thereof are precisely aligned with Data Track 1 (single data pickup element) or Data Track 1 and 2 (two data pickup elements). By lining up tabs 66A,66B with the lower slots in alignment guides 53 and 54 and then snapping mounting frame 32 onto the resilient hooks 51,52, the registration pins and apertures mate in an appropriate manner for the read head to be accurately positioned for the associated track reading.

Similarly, for Track 2 alignment and registration of a single track read head or Track 2 and 3 alignment and registration of a dual track read head, registration pins 61A,61B are received into registration apertures 56A,56B while registration pins 62A,62B are received into slots 57A,57B. The upper slots in alignment guides 53 and 54 are used generally to align mounting frame 32 relative to the card guide 31 for this reading condition and then the two pieces are snap mounted together.

It should be apparent that other forms of alignment arrangement could also be utilized. For example, a simple alignment marker line positioned on the side wall of card guide 31 could be utilized with the alignment tab to indicate where the two parts should be positioned for each of the two cases. Alternatively, an alignment mark on the outside end of each of the resilient hook arms 51,52 might be used cooperatively with two pairs of alignment marks on back surfaces of mounting frame 32 to provide this alignment function.

Mounting frame 32 carries read head 30 in a central mounting frame member 60 which has a central aperture 64 therein. Mounting frame 32 also has a pair of integral spring elements 67 and 68 formed thereon. These integral spring elements are preferably E-shaped springs having five interconnected resilient arc segments including a central arm segment 69,70 which is cantilevered from an edge of mounting frame 32 and has a free end with a tapered back surface that engages a back surface of read head 30. This leaf spring type of arrangement biases read head 30 toward the card guide slot with a spring pressure that maintains good contact between the magnetic pick up heads on a front surface and data tracks on a data card as it is manually swiped through the card slot. The combination of the characteristics of the engineering plastic used to form mounting frame 32 and the design of the E-shaped spring elements provide adequate spring force and reliable operation over the life of the unit which may involve many thousands of card swipe operations.

The simple method of assembly of this card reader unit should now be apparent. First, read head 30 is placed in central frame member 63 on back wall 60 of mounting frame 32. Then mounting frame 32 is snapped into place on card guide element 31 using the snap hook mounting arrangement and selecting one of the track alignment registrations as described above. After this subassembly has been put together, the card reader unit may be assembled into the housing of a terminal in the manner shown in FIGS. 2–5. Wires may then be connected to the terminals on the back of read head 30 to take the signals therefrom to appropriate signal processing circuits. Signal processing circuits may be of the type described in Chang et al. U.S. Pat. No. 4,788,420.

Referring now to FIGS. 14–23, another embodiment of this invention will be described. Data carrier reader assembly 100 comprises a card guide element 101, a mounting frame 102 and a read head 103. Read head 103 is carried in a central frame member 125 on mounting frame 102. Central frame member 125 has tapered wall surfaces as shown in the section view of FIG. 25 to facilitate slight rotation of read head 103. This helps maintain contact between the front pickup surface of the read head and the data card under conditions of warpage of the card. Mounting frame 102 is snap mounted to card guide element 101 using alignment, registration, and snap hook mounting similar to that of the embodiment already described.

Card guide element 101 has side wall members 110 and 111 and a bottom wall member 112. Side wall member 111 has a read head aperture 113 formed therein for admitting the forward part of read head 103 into the card guide slot. Two pairs of registration apertures 114A and 114B cooperate with registration pins 123 and 124 on mounting frame 102 to provide two alternative registered mounting positions for mounting frame 102.

Alignment tabs 121 and 122 on mounting frame 102 cooperate with alignmet slot arrangements 115 and 116 to guide the initial positioning of mounting frame 102 during the assembly operation. As with the previously described embodiment, this cooperative alignment means facilitates the assembly of the two parts in the selected alignment for reading a selected track or tracks on the data card and thereafter indicates which of the two optional track reading positions is active for that particular assembly.

The simple snap-mounting arrangement involves the use of resilient hook arms 117 and 118 to fasten mounting frame 102 to card guide 101 with the hook elements 117 and 118 cooperating with bracket portions 130 and 131 on mounting frame 102. These bracket portions 130 and 131 are longer than the hook arms so that the two different registered mounting positions are accommodated.

Spring means 210 is in this embodiment a single E-shaped spring member 210 with a single head member 126 which carries head contact elements 126A and 126B, both having tapered contact surfaces for allowing rotation of the read head with respect to the head member. The structure of spring member 210 is illustrated in the section views of FIGS. 24, 25 and 26.

An integral wire dressing harness arrangement 220 may be provided on mounting frame 102 to assist in organizing the signal wires leading from the read head 103 to signal processing circuitry. In this case data carrier reader assembly 100 is of the type that includes a circuit board carrying circuitry for processing the signals from the transducer used to read data stripes on data carriers. Resilient hook members 201 and 202 are provided on side wall 110 for snap mounting of a circuit board to the overall assembly.

This embodiment of the invention can be used to produce a card reader subassembly in which all of the basic card reader elements, including processing circuitry are packaged together into one unit. This card reader unit may then be mounted into a small housing to form a small card reader module which can be interfaced to a POS terminal or other equipment. Alternatively, the card reader unit can be mounted into a slot region of a terminal to be integrated with the other subassemblies into a completed unit.

The above descriptions of two different embodiments of this invention is given as an example of the general structural and functional features of this invention. It should be understood that persons of skill in this art could make many modifications without departing from the scope of the invention. For example, it should be apparent that the snap hook mounting feature combined with the cooperative registration means using pins and apertures could be deployed independently of the integral biasing spring feature. The integral biasing spring feature would not be required for a data reading transducer that does not require contact with the data carrier. Any optical read head could simply be accurately positioned on the mounting frame so that it is set up for selectively reading a particular optical data track.

It should be apparent that the mounting frame structure and the cooperative registration means and alignment means employed in the embodiment of FIGS. 6-13 could also be used with the card guide element 101 in the embodiment of FIGS. 14-26. The reverse is also true.

Thus this invention is not limited to the embodiments disclosed but includes all embodiments and variations within the scope of the following claims.

What is claimed is:

1. In a reader assembly for reading a data carrier having at least one data track located at a prearranged data track position thereon:
   a transducer means having at least one data pickup element on a front face thereof;
   guide means defining a guide slot having first and second side wall members and a bottom wall member adapted to guide a data carrier through said reader assembly, said first side wall member having an access window formed therein for permitting communication between said transducer means and said data carrier; and
   frame means for carrying said transducer means in a prearranged location thereon;
   said guide means and said frame means including:
   a cooperative registration means, including a set of first position registration elements formed on said first side wall member and a set of second position registration elements formed on said frame means and cooperatively engaging said first position registration elements for establishing an accurately registered mounting relationship between said frame means and said guide means and thereby defining an accurate position location for said transducer means relative to said access window such that said data pickup element is accurately aligned with said data track; and
   at least a pair of resilient hook arms carried on said first side wall member and cooperating with a pair of hook engaging surfaces on said frame means to mount said frame means to said guide means.

2. Apparatus as claimed in claim 1, wherein
   said data track on said data carrier is positioned at a prearranged data track location corresponding to a one of at least first and second predefined data track locations on said data carrier,
   said cooperative registration means comprises two sets of first position registration elements formed on said first side wall member of said guide means and a single set of second position registration elements formed on said frame means and selectably engagable with each of said two sets of first position registration elements to position said frame means relative to said guide means in a selectable one of first and second registered positions and thereby aligning said data pickup element of said transducer means with one of said first and second predefined data track locations;
   said hook engaging surfaces on said frame means being formed to permit engagement with said pair of resilient hook arms in both said first and second registered positions.

3. Apparatus as claimed in claim 2, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

4. Apparatus as claimed in claim 3, wherein said first alignment means comprises first and second pairs of guide slots formed on said first side wall member of said guide means, and said second alignment means comprises a pair of alignment tabs formed on said frame means and adapted to be received into said guide slots.

5. Apparatus as claimed in claim 1, wherein
said data carrier has a magnetic data track thereon,
said data pickup element on said transducer means is a magnetic read head adapted to contact said magnetic data track for reading data on said track,
said access window is an aperture formed in said first one of said side wall members to admit said magnetic read head into said guide slot, and
said frame means is formed from a plastic material and has a read head frame formed thereon for carrying said magnetic read head and a spring means integrally formed thereon for engaging a magnetic read head carried in said read head frame and spring biasing said read head toward said guide slot to maintain contact pressure between said magnetic read head and said magnetic data track as said data carrier is passed through said guide slot.

6. Apparatus as claimed in claim 5, wherein
said data carrier has three predefined data track positions associated therewith and comprising tracks 1, 2, and 3, and said data carrier has only a pair of adjacent magnetic data tracks formed thereon at a preselected one of track 1 and 2 pair or a track 2 and 3 pair,
said magnetic pick up head has two magnetic pickup elements formed thereon at prearranged positions for simultaneously reading magnetic data on a pair of adjacent magnetic data tracks;
said cooperative registration means comprises two sets of first position registration elements formed on said first side wall member of said guide means and a single set of second position registration elements formed on said frame means and selectably engagable with each of said two sets of first position registration elements to position said frame means relative to said guide means in a selectable one of first and second registered positions, said first registered position aligning said two magnetic pickup elements with said track 1 and 2 pair and said second registered position aligning said two magnetic pick up elements with said track 2 and 3 pair;
said hook engaging surfaces on said frame means being formed to permit engagement with said pair of resilient hook arms in both said first and second registered positions.

7. Apparatus as claimed in claim 6, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

8. Apparatus as claimed in claim 7, wherein said first alignment means comprises first and second pairs of guide slots formed on said first side wall member of said guide means, and said second alignment means comprises a pair of alignment tabs formed on said frame means and adapted to be received into one of said first and second pairs of guide slots, said first pair of guide slots being labeled to indicate its association with track 1 and 2 mounting registration and said second pair of guide slots being labeled to indicate its association with track 2 and 3 mounting registration.

9. In a reader assembly for reading a data carrier having at least one magnetic data track located at a prearranged position thereon:
a transducer means having at least one magnetic pickup element on a front face thereof for reading said magnetic data track;
guide means defining a guide slot having first and second side wall members and a bottom wall member adapted to guide a data carrier through said reader assembly, said first side wall member having an access window formed therein for admitting said front face of said transducer means into said guide slot;
frame means for carrying said transducer means in a prearranged location thereon; and
mounting means for mounting said frame means in a prearranged location on said first side wall member of said guide means such that said transducer means is accurately positioned in said access window;
said frame means being formed from a plastic material and having a frame member carrying said transducer means and spring means integrally formed on said frame member from said plastic material with a free end portion of said spring means contacting a rear portion of said transducer means to urge said transducer means toward said second side wall member of said guide slot and thereby to produce contact pressure between said magnetic pick up element and said magnetic data track as said data carrier is passed through said guide slot.

10. Apparatus as claimed in claim 9, wherein
said transducer means comprises a magnetic read head having a metal housing;
said frame means has a central frame member receiving said magnetic read head and holding said magnetic read head in a prearranged position, said central frame member having tapered top and bottom walls which permit slight rotation of said magnetic read head around a central axis thereof to accommodate a warped card passing through said guide means;
said integrally formed spring means has a head portion with a pair of contact portions formed thereon for contacting back edges of said metal housing to urge said housing toward said guide slot, each of said contact portions having a tapered contact surface to facilitate said slight rotation of said housing relative thereto.

11. Apparatus as claimed in claim 9, wherein
said frame means has a central frame member receiving and supporting said transducer means;
said integrally formed spring means comprises a single E-shaped spring element with a base member attached to said frame means and a central spring arm extending in cantilevered fashion behind said frame member and having a head member formed on a free end thereof with a pair of tapered contact elements being formed on a back end of said head member for contact with a back region of said transducer means.

12. Apparatus as claimed in claim 9, wherein
said frame means has a central frame means receiving and supporting said transducer means; and
said integrally formed spring means comprises a pair of E-shaped spring elements each having a base member attached to opposing ends of said frame means and a central spring arm extending in cantilevered fashion toward said frame member and having a tapered contact element on a free end of said spring arm for contact with a back region of said transducer means, 13. Apparatus as claimed in claim 1, wherein
said data track on said data carrier is positioned at a prearranged data track location corresponding to a one of at least first and second predefined data track locations on said data carrier, and
said cooperative registration means comprises upper and lower pairs of registration pins formed on said frame means at the corners of a regular rectangle, and upper and lower pairs of registration apertures formed in said first side wall of said guide means at the corners of a regular rectangle together with first and second registration slots formed in said first side wall and each located between corresponding ones of said apertures in said upper pair and said lower pair, said upper and lower pairs of registration pins together with said registration apertures defining upper and lower registered mounting positions for said frame means relative to said guide means, said upper registered mounting position being active when said upper pair of registration pins is mounted in said upper pair of registration apertures with said lower pair of registration pins located in said registration slots, said lower registered mounting position being active when said lower pair of registration pins is mounted in said lower pair of registration apertures with said upper pair of registration pins located in said registration slots;
said hook engaging surfaces on said frame means being formed to permit engagement with said pair of resilient hook arms in both said upper and lower registered mounting positions.

14. Apparatus as claimed in claim 13, further comprising track alignment indicating means including a first alignment means formed on said first side wall member of said guide means and a second alignment means formed on said frame means, said first and second alignment means cooperatively assisting in aligning said guide means and said frame means for mounting said frame means in one of said first and second registered positions.

15. Apparatus as claimed in claim 14, wherein said first alignment means comprises first and second pairs of guide slots formed on said first side wall member of said guide means, and said second alignment means comprises a pair of alignment tabs formed on said frame means and adapted to be received into said guide slots.

16. Apparatus as claimed in claim 13, wherein said data carrier has a magnetic data track thereon, said data pickup element on said transducer means is a magnetic pick up head adapted to contact said magnetic data track for reading data on said track, said access window is an aperture formed in said first one of said side wall members to admit said magnetic pick up head into said guide slot, said frame means is formed from a plastic material and has integrally formed spring means carried thereon for engaging said transducer means and biasing said transducer means toward said guide slot to maintain contact pressure between said magnetic pick up head and said magnetic data track as said data carrier is passed through said guide slot.

17. Apparatus as claimed in claim 16, wherein
said magnetic pick up head has a metal housing;
said frame means has a central frame member receiving said magnetic pick up head and holding said head in a prearranged position, said central frame member having tapered top and bottom walls which permit slight rotation of said magnetic head pick up unit around a central axis thereof to accommodate a warped card passing through said guide means;
said integrally formed spring means has a pair of contact regions formed thereon for contacting back edges of said metal housing to urge said housing toward said guide slot, each of said contact regions having a tapered contact surface to facilitate said slight rotation of said housing of said transducer means.

18. Apparatus as claimed in claim 17, wherein said integrally formed spring means comprises a single E-shaped spring element with a base member attached to said frame means and a central spring arm extending in cantilevered fashion behind said frame member and having a head member formed on a free end thereof with said pair of contact elements being formed on a back end of said head member for contact with a back region of said transducer means.

19. Apparatus as claimed in claim 17, wherein said integrally formed spring means comprises a pair of E-shaped spring elements each having a base member attached to opposing ends of said frame means and a central spring arm extending in cantilevered fashion toward said frame member and having a tapered contact element on a free end of said spring arm for contact with a back region of said transducer means,

* * * * *